Patented Sept. 12, 1933

1,926,739

UNITED STATES PATENT OFFICE 1,926,739

METHOD OF ACCELERATING THE VULCANIZATION OF RUBBER AND PRODUCT THEREOF

William J. Clapson and John R. Sheppard, Joplin, Mo., assignors to The Eagle-Picher Lead Company, Cincinnati, Ohio, a corporation of Ohio No Drawing. Application September 8, 1932
Serial No. 632,186

15 Claims. (Cl. 18—53)

Our invention relates to a method of vulcanizing rubber and rubber-like compositions, and it is particularly directed to a novel method of accelerating the vulcanizing process.

The particular object of our invention relates to an improvement in the method of vulcanizing rubber and rubber-like compositions with mercapto-aryl-thiazoles, such as mercapto-benzo-thiazole, through the use of basic carbonate white lead as the activator for the accelerator.

It has heretofore been shown that certain thiazole compounds provide efficient accelerators for the vulcanization of rubber. A generic class of chemical compounds embodying a thiazole group as part of their structure is disclosed in U. S. Patent 1,544,687. These compounds, particularly those having a mercapto group joined to the thiazole ring, indicated under approved nomenclature as 2-mercapto-triazole, have been found to be excellent accelerators. Structurally the group is written:

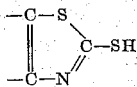

A specific compound of this class is 2-mercapto-benzo-thiazole:

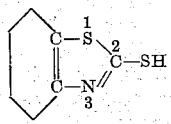

which may be regarded as a species of the subgeneric class of thiazoles designated as mercapto-aryl-thiazoles.

Now it has long been known to those familiar with the art that to obtain the advantages of these mercapto-thiazoles as accelerators of the vulcanization of rubber certain materials commonly called "activators", as for example, metallic oxides or other metallic compounds such as salts of resin or fatty acids, must be present in the rubber mixture. The material most commonly used is zinc oxide; to a lesser extent litharge (lead monoxide) has been employed. It is also well known that when litharge is used as the activator of a mercapto-thiazole, such as mercapto-benzo-thiazole, the rubber mixture vulcanizes much faster, and at a lower temperature, than when zinc oxide is the activator; in many mixtures, such as those containing large amounts of carbon black, the physical properties of the vulcanized product are superior to those obtained when zinc oxide is used as the activator. Because of the faster cure of mercapto-benzo-thiazole with litharge than with zinc oxide the quantity of mercapto-benzo-thiazole may be greatly reduced when litharge is the activator, or the time of cure shortened. In many cases reduction of the quantity of mercapto-benzo-thiazole, to maintain a curing time similar to that required with the zinc oxide mixture, results in a cheaper mixture, and this circumstance, together with the enhanced physical properties conferred by litharge activation, makes the use of the latter very desirable. However, when using such a litharge stock, even with the decreased amount of mercapto-benzo-thiazole, vulcanization of the rubber mixture may, under some conditions, begin at some undesirable point during processing and "scorching" is then said to have occurred. By our present invention it is disclosed how the desirable features of the rubber mixture accelerated with litharge-activated mercapto-thiazoles may be retained and the disadvantages of scorching substantially removed.

To illustrate the curing and scorching properties of rubber mixtures using basic carbonate white lead, litharge, and zinc oxide with mercapto-benzo-thiazole, the following example is given. The results quoted are typical of many others we have obtained, using various base formulas. As to the actual figures obtained, it will be understood by those familiar with the art that the relative values obtained rather than the absolute values constitute the comparison: tests conducted from laboratory to laboratory will give somewhat different absolute values.

The tendency to "scorch" was estimated as follows: small, equal-sized portions of the mixed stocks were heated at 210° F. for specific periods, cooled, placed in high-test gasoline, and the tendency to disperse observed. Least tendency to scorch coincides with greatest tendency to disperse. In the following tables lowest scorching tendency (i. e. the most desirable tendency) is denoted by lowest number.

Examples

| | Zinc oxide stock A | Litharge stock B | Basic lead carbonate stock C |
|---|---|---|---|
| Smoked sheet | 100 | 100 | 100 |
| Sulphur | 3.12 | 3.12 | 3.2 |
| Mercapto-benzo-thiazole | 0.78 | 0.15 | 0.15 |
| Litharge | | 8 | |
| Basic carbonate white lead | | | 8 |
| Zinc oxide | 9 | | |
| Gas black | 42.5 | 42.5 | 42.5 |
| Stearic acid | 3 | 3 | 3 |
| Bardol | 3 | 3 | 3 |
| Antioxidant | 1.25 | 1.25 | 1.25 |

Scorch test—Heated at 210° F.

| | | | |
|---|---|---|---|
| Heated ¼ hr | 2 | 4–5 | 2 |
| Heated ½ hr | 3 | 5 | 2–3 |
| Heated 1 hr | 5 | 5 | 5 |
| Heated 1½ hr | 5 | 5 | 5 |

Repeat scorch test—Heated at 210° F.

| | | | |
|---|---|---|---|
| Heated ¼ hr | 1 | 2 | 2 |
| Heated ½ hr | 2 | 3 | 2 |
| Heated ¾ hr | 2–3 | 5 | 2–3 |
| Heated 1 hr | 2–3 | 5 | 2–3 |

Another repeat test—Heat at 225° F.

| | | | |
|---|---|---|---|
| Heated ¼ hr | 2–3 | 3–4 | 2–3 |
| Heated ½ hr | 4–5 | 5 | 4 |
| Heated ¾ hr | 5 | 5 | 5 |
| Heated 1 hr | 5 | 5 | 5 |

Curing test

| Cure | Tensile lbs./in.² | Elongation % | Tensile lbs./in.² | Elongation % | Tensile lbs./in.² | Elongation % |
|---|---|---|---|---|---|---|
| 15′ at 258° F | 1000 | 500 | 2060 | 620 | 1480 | 615 |
| 30′ at 258° F | 2550 | 580 | 3000 | 640 | 2580 | 620 |
| 60′ at 258° F | 3380 | 610 | 3260 | 638 | 3200 | 635 |
| 90′ at 258° F | 3820 | 580 | 3800 | 620 | 3700 | 615 |
| 15′ at 274° F | 2180 | 605 | 2360 | 620 | 2065 | 645 |
| 30′ at 274° F | 2840 | 560 | 3260 | 610 | 2920 | 600 |
| 60′ at 274° F | 3770 | 575 | 3825 | 595 | 3890 | 600 |

The data above show: (a) that the litharge stock is distinctly more scorchy than the zinc oxide stock, but that the basic lead carbonate stock is not nearly as scorchy as the litharge stock and is, in fact, substantially as good as the zinc oxide stock in this respect; (b) that both the litharge and the carbonate stocks are at least on a par with the zinc oxide stock in properties of the vulcanizate ("curing test") if not superior and that this holds even though only 0.15% mercapto-benzo-thiazole had been used with the lead-activated stocks as against 0.78% mercapto-benzo-thiazole with the zinc stock.

The zinc oxide formula above is similar to many now being successfully processed in rubber factories and the scorching tests show a substantial equality in freedom of scorching as between the basic lead carbonate stock and the zinc oxide stock. On the other hand, rubber factory experience confirms the less satisfactory character of the litharge stock as regards scorching.

Having thus disclosed the invention, we claim

1. An improvement on the method of accelerating the vulcanization of rubber with a material embodying the following organic structure:

$$\begin{array}{c} -C-N \\ \parallel \quad \phantom{x} \diagdown \\ \phantom{-C}C-S- \\ \diagup \\ -C-S \end{array}$$

which comprises employing basic carbonate white lead as activator.

2. An improvement on the method of accelerating the vulcanization of caoutchouc in the presence of a mercapto-thiazole, or derivative thereof, which comprises employing basic carbonate white lead as activator.

3. An improvement on the method of accelerating the vulcanization of caoutchouc in the presence of a mercapto-aryl-thiazole, or a derivative thereof, which comprises employing basic carbonate white lead as activator.

4. An improvement on the method of accelerating the vulcanization of caoutchouc in the presence of a sulphur reaction product of phenyl mustard oil, which comprises employing basic carbonate white lead as activator.

5. An improvement on the method of accelerating the vulcanization of caoutchouc in the presence of mercapto-benzo-thiazole, which comprises employing basic carbonate white lead as activator.

6. A method of accelerating the vulcanization of caoutchouc that comprises vulcanizing the same in the presence of basic-carbonate white lead and a material embodying the following organic structure:

$$\begin{array}{c} -C-N \\ \parallel \quad \phantom{x} \diagdown \\ \phantom{-C}C-S- \\ \diagup \\ -C-S \end{array}$$

7. A method of accelerating the vulcanization of caoutchouc that comprises vulcanizing the same in the presence of basic carbonate white lead and a mercapto-thiazole or derivative thereof.

8. A method of accelerating the vulcanization of caoutchouc that comprises vulcanizing the same in the presence of basic carbonate white lead and a mercapto-aryl-thiazole, or a derivative thereof.

9. A method of accelerating the vulcanization of caoutchouc that comprises vulcanizing the same in the presence of basic carbonate white lead together with a sulphur reaction product of phenyl mustard oil.

10. A method of accelerating the vulcanization of caoutchouc that comprises vulcanizing the same in the presence of basic carbonate white lead together with mercapto-benzo-thiazole.

11. A caoutchouc product which has been vulcanized in the presence of basic carbonate white lead and a material employing a thiazole ring having a mercapto group joined to the saturated carbon atom, or a derivative of this material.

12. A caoutchouc product which has been vulcanized in the presence of basic carbonate white lead and a mercapto-thiazole or a derivative thereof.

13. A caoutchouc product which has been vulcanized in the presence of basic carbonate white lead and a mercapto-aryl-thiazole or a derivative thereof.

14. A caoutchouc product which has been vulcanized in the presence of basic carbonate white lead and a sulphur reaction product of phenyl mustard oil.

15. A caoutchouc product which has been vulcanized in the presence of basic carbonate white lead and mercapto-benzo-thiazole.

WILLIAM J. CLAPSON.
JOHN R. SHEPPARD.